(12) United States Patent
Swallow

(10) Patent No.: US 7,099,286 B1
(45) Date of Patent: Aug. 29, 2006

(54) METHOD AND SYSTEM FOR FINDING SHARED RISK DIVERSE PATHS

(75) Inventor: George Swallow, Concord, MA (US)

(73) Assignee: Cisco Technology, Inc., San Jose, CA (US)

( * ) Notice: Subject to any disclaimer, the term of this patent is extended or adjusted under 35 U.S.C. 154(b) by 997 days.

(21) Appl. No.: 10/152,946

(22) Filed: May 22, 2002

(51) Int. Cl.
 *H04L 12/28* (2006.01)

(52) U.S. Cl. ...................... 370/255; 370/256

(58) Field of Classification Search ............ None
See application file for complete search history.

(56) References Cited

U.S. PATENT DOCUMENTS

2002/0030864 A1* 3/2002 Chaudhuri et al. ......... 359/110
2002/0131424 A1* 9/2002 Suemura .................... 370/400
2006/0050634 A1* 3/2006 Gous ......................... 370/229

OTHER PUBLICATIONS

S. Chaudhuri et al., "Control of Lightpaths in an Optical Network", Internet Draft, AT&T Research, Aug. 2000.
Bhandari Ph.D., Ramesh, *Survivable Networks Algorithms for Diverse Routing*, AT&T Laboratories, 1999, pp. 175-188.

* cited by examiner

*Primary Examiner*—Duc Ho
(74) *Attorney, Agent, or Firm*—Cindy Kaplan

(57) ABSTRACT

A method for finding shared risk diverse paths is disclosed. The method includes receiving route information at a node and running a shortest path algorithm to identify a first path. A shared risk metric is assigned to links and nodes with the first path. The method further includes running the shortest path algorithm with the shared risk metrics assigned to identify a second path and comparing the first and second paths. New shared risk metrics are assigned to links and nodes in the second path if the first and second paths are not diverse. The second path then becomes the first path and the algorithm is repeated.

17 Claims, 3 Drawing Sheets

METHOD AND SYSTEM FOR FINDING SHARED RISK DIVERSE PATHS

BACKGROUND OF THE INVENTION

The present invention relates generally to routing communications within a computer network, and more specifically, to a method and system for finding shared risk diverse paths.

Communication in a computer network involves the exchange of data between two or more entities interconnected by communication links and subnetworks. Entities concerned primarily with the correct routing of information in the network are called routers, to distinguish them from end systems which process traffic but do not take part in routing it. There are two fundamentally different approaches to the distribution and use of routing information in a network, called Distance Vector Routing and Link State Routing. In the former, each router tells its immediate neighbors how it would reach each entity in the network, updating this as similar information is received from its neighbors. In the latter, each router arranges to send information about its own connectivity to its neighbors to all routers in the network. Each router then runs an algorithm called Shortest Path First (SPF) to find the best route from itself to each entity in the network. Early routing protocols (e.g. RIP) used the Distance Vector approach. Link State Routing protocols first appeared in the early 1980s, and became widely used in the Internet during the 1990s. OSPF (Open Shortest Path First) and Integrated IS—IS (Intermediate System—Intermediate System) are widely used examples of such protocols. Although there are many detailed differences between them, the fundamental algorithms are the same for both of them. OSPF is a routing protocol developed for IP (Internet Protocol). IS—IS was originally designed for Open Systems Interconnection (OSI) protocols, and was subsequently extended to deal with IP.

With link state routing, each router must discover its neighbors and learn their network addresses. A cost (typically related to the link bandwidth) is associated, generally by network management, with each link. One or more link state packets are then constructed containing this information, and flooded to all routers in the network. Dijkstra's Shortest Path First algorithm is then used at each router to find the shortest path to every other router. This algorithm maintains a set of nodes whose shortest path is already known and operates by adding one node to this known set with each iteration. The next step is to the next closest router along this path, always choosing the one which has the lowest cost from the local node. This process continues until all reachable nodes are in the known set with costs assigned to each. If a failure occurs along the shortest path, a backup route is identified.

Network failures include, for example, node failure due to equipment breakdown or equipment damage and link failure due to inadvertent fiber cable cut. Service disruption due to a network failure can cause customers significant loss of revenue during the network down time, thus network survivability against physical failures is important. In order to provide highly available circuits, carriers establish diversely routed back up paths. Routing diversity is needed to achieve the reliability and survivability expected of modern transport networks. Algorithms currently exist for finding simple node and link diverse paths. This strategy assumes that the failure of a particular link or node is an independent event. However, due to the fact that links often share facilities such as muxes, fibers or conduits, such an assumption is not always true.

Manual provisioning techniques are commonly used to ensure routing diversity. Implicitly in the provisioning operation is the notion of a Shared Risk Link Group (SRLG). SRLG is a relatively new concept that has been introduced to provide inputs necessary to plan for reliability in transport networks (see, for example, S. Chaudhuri et al., "Control of Lightpaths in an Optical Network", IETF Internet Draft, February 2000). A SRLG is a group of links that shat share a component whose failure causes the failure of all links of the group. The SRLG is associated with an entity at risk, typically a fiber span, and is a union of all links that ride on the fiber span. Links may traverse multiple fiber spans, and thus be in multiple SRLGs. In order to identify SRLGs, links are tagged with a token which indicates a particular facility which is at risk of failure. For example, a particular conduit may have a token '45' and any circuit that passes through that conduit would carry the token '45' (among a possible long list of other tokens). All of the links that carry this token are part of a SRLG. When looking for backup routes, a route which is independent of any SRLG that is associated with the primary path is sought.

Internet Gateway Protocols (IGPs) such as Open Shortest Path Forwarding (OSPF) may be used to propagate SRLGs and other physical link attributes. Neighbor discovery techniques are used to determine adjacent node connectivity. This local resource information is then advertised throughout the network via the IGP. Using this information, each node can obtain a complete view of the network. However, these techniques do not address SRLGs or diversity in routing.

SUMMARY OF THE INVENTION

A method for finding shared risk divers paths is disclosed. The method includes receiving route information at a node and running a shortest path algorithm to identify a first path. A shared risk metric is assigned to links and nodes with the first path. The method further includes running the shortest path algorithm with the shared risk metrics assigned to identify a second path and comparing the first and second paths. New shared risk metrics are assigned to links and nodes in the second path if the first and second paths are not diverse.

The method may further include repeating the running of the algorithm and comparing paths until diverse paths are found or a limit on iterations is reached.

In another aspect of the invention, a computer program product for finding shared risk diverse paths comprises code that receives route information at a node and runs a shortest path algorithm to identify a first path, code that assigns shared risk metrics to links and nodes within the first path and runs the algorithm with the shared risk metrics assigned to identify a second path. The product further includes code that compares the first and second paths and assigns new shared risk metrics to links and nodes in the second path if the first and second path are not diverse, and a computer-readable storage medium for storing codes.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

The present invention provides a method and system for finding shared risk diverse paths. The concept of Shared Risk Link Groups (SRLGs) is used to express a risk relationship that associates a group of links with a single failure. As described below, the method and system focus on shared risks rather than a group of links, thus 'shared risk' as used herein applies to nodes as well as links. In service provider networks, risks are typically localized to limited area of the topology. The feasibility of finding a shared risk diverse path is therefore relatively high.

Figure 1:
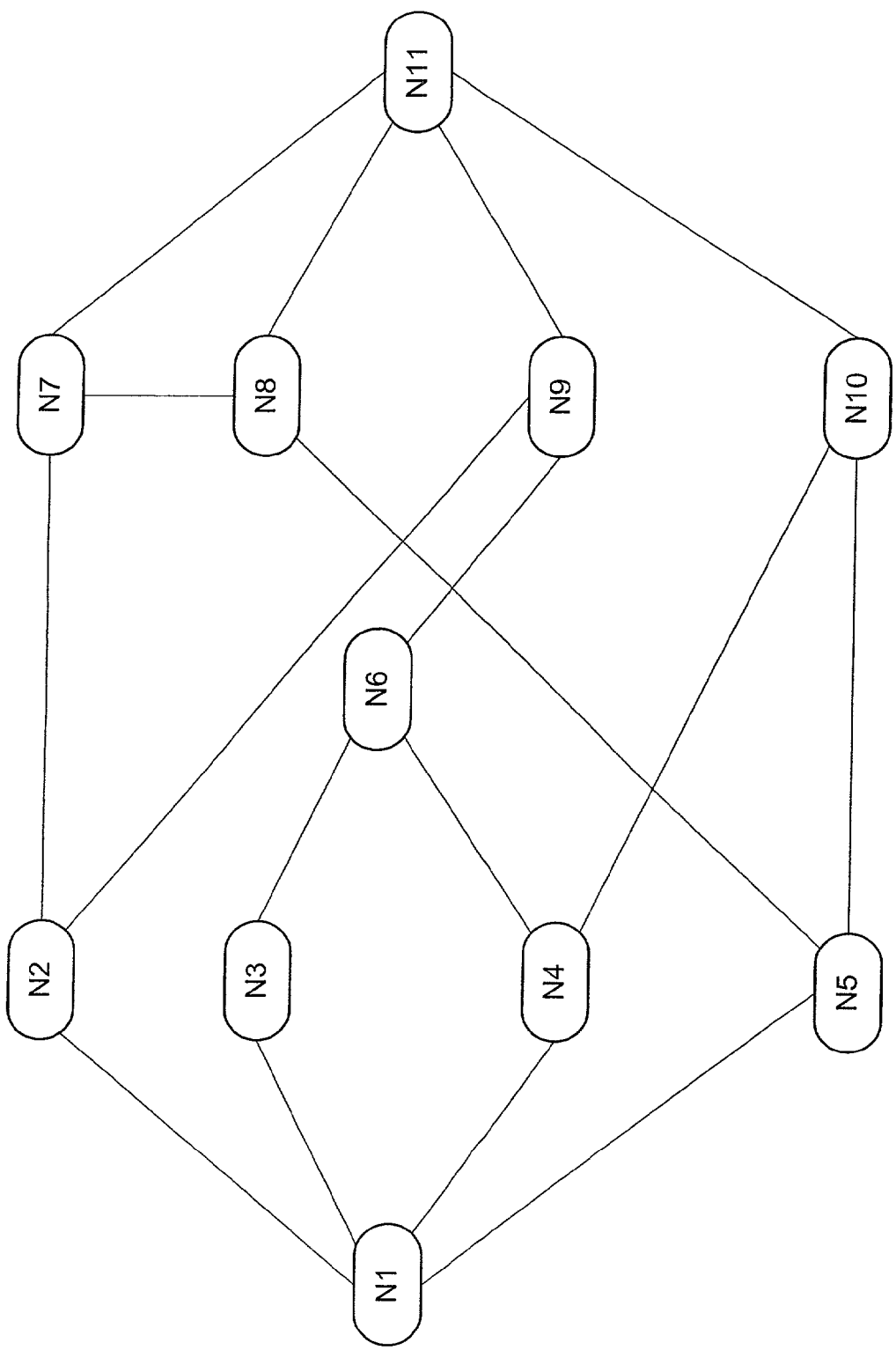
FIG. 1 is a diagram of a network system comprising a plurality of network elements.

The invention operates in the context of a data communication network including multiple network elements. FIG. 1 is a block diagram of a network system, generally indicated at 10, comprising a collection of network elements or nodes (N1–N11). The algorithm may be used within a network from edge to edge (e.g., finding a path between nodes 1 and 11). Some of the nodes in a network that employs the present invention may be network devices such as routers and switches. The nodes may include source, destination, and intermediate routers. Some of the nodes may be, for example, suitably configured routers such as those available from Cisco Systems, Inc. of San Jose, Calif.

As used herein the term router is used to refer to devices that forward packets based on network and higher layer information. The router may include, for example, a master central processing unit (CPU), interfaces, and a bus. The CPU preferably includes memory and a processor. When acting under the control of appropriate software or firmware, the CPU is responsible for such router tasks as routing table computations, network management, and general processing of packets. It preferably accomplishes all these functions under the control of software including an operating system (e.g., a version of the Internetwork Operating System (IOS®) of Cisco Systems, Inc.) and any appropriate applications software. The CPU may include one or more processors such as a processor from the Motorola family or microprocessors of the MIPS family of microprocessors. In an alternative embodiment, the processor is specially designed hardware for controlling operations of the router. Memory may be non-volatile RAM and/or ROM. However, there are many different ways in which memory could be coupled to the system. In an alternative embodiment, a router or switch may be implemented on a general purpose network host machine such as the computer system of FIG. 2.

Figure 2:
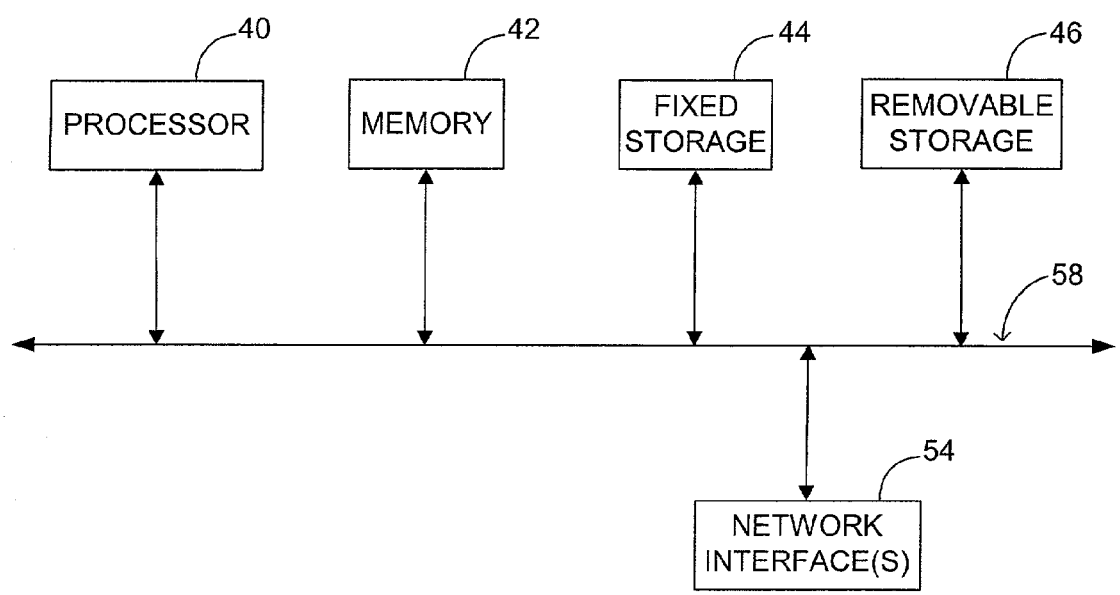
FIG. 2 is a diagram illustrating an example of a computer system that can be utilized to execute software of an embodiment of the present invention.

FIG. 2 shows a system block diagram of computer system that may be used to execute software of an embodiment of the invention. The computer system may include subsystems such as a central processor 40, system memory 42, removable storage 46 (e.g., CD-ROM drive), and a hard drive 44 which can be utilized to store and retrieve software programs incorporating computer code that implements aspects of the invention, data for use with the invention, and the like. The computer readable storage may also include flash memory, or system memory. Other computer systems suitable for use with the invention may include additional or fewer subsystems. For example, the computer system may include more than one processor 40 (i.e., a multi-processor system) or a cache memory.

The system bus architecture of the computer system is represented by arrows 58 in FIG. 2. However, these arrows are only illustrative of one possible interconnection scheme serving to link the subsystems. For example, a local bus may be utilized to connect the central processor 40 to the system memory 42. The components shown and described herein are those typically found in most general and special purpose computers and are intended to be representative of this broad category of data processors. The computer system shown in FIG. 2 is only one example of a computer system suitable for use with the invention. Other computer architectures having different configurations of subsystems may also be utilized. It is to be understood that the network interface is not required. For example, all of the relevant topology information may be input manually.

Communication between computers within the network is made possible with the use of communication protocols, which govern how computers exchange information over a network. The computer may include an input/output circuit used to communicate information in appropriately structured form to and from parts of the computer and associated equipment. Preferably, each of these interfaces includes a plurality of ports appropriate for communication with the appropriate media, and associated logic, and in some instances memory. The associated logic may control such communication intensive tasks as packet integrity checking and media control and management.

The routers facilitate the flow of data packets throughout the system by routing the packets to the proper receiving stations. The packet typically contains the address of the final destination station. The final destination address remains constant as the packet traverses the networks. A key function of router is determining the next station to which the packet is sent. The routers typically execute routing algorithms to decide over which communication links incoming packets should be transmitted. A type of network layer routing protocol commonly employed by routers is a link state routing protocol. With link state routing, each router must discover its neighbors and learn their network addresses, measure the delay to each of its neighbors, construct a packet containing this information, send the packet to all other routers, and compute the shortest path to every other router.

When router is booted, its first task is to learn who its neighbors are. It accomplishes this goal by sending a special HELLO packet on each point-to-point line. The router on the other end is expected to send back a reply telling who it is.

Once the information needed for the exchange has been collected, the next step is for each router to build a packet containing all of this data. The packet (a Link State Packet) starts with the identity of the sender, followed by a sequence number, age, and a list of neighbors. For each neighbor, the cost to that neighbor, a network management parameter, is given. The link state database is synchronized by having the routers exchange LSPs to build the link state database. The routers flood the networks with LSPs, check integrity using a checksum, and resend the LSPs by forwarding them out on all enabled interfaces except the interface on which each was received or on which the same LSP has already been received. The router's link state database is thus a combination of the router's own adjacency database and the LSP packets arriving from all other routers. When the link state database is complete in conventional systems, a copy of the database, which includes a map of the network and its links, services, and external routes for the area, is maintained in each router. It is to be understood that the above process for defining a topology database is provided only as an example. Any procedure that provides a suitable topology database may be used. For example, a net management station may query all of the switches for their topology information. Also, different types of routing protocols may be used to distribute the routing information.

Once a router has accumulated a full set of link state packets, it can construct the entire subnet graph since every link is now represented. The algorithm described below, is then run locally to construct the shortest path, while considering shared risks, to all reachable destinations. The output of the algorithm is the next hop (i.e., intermediate router) to the destination. The results of this algorithm are installed in the routing tables.

In the method of the present invention, multiple attempts are made to find paths through a network. Links that carry shared risks which are also included in a specific path are penalized (i.e., made to look less attractive in the Dijkstra algorithm). As the algorithm runs, the penalty associated with a risk that is common to a primary and backup path is increased. As the algorithm continues, the problem areas are avoided and diverse routes are usually found.

Figure 3:
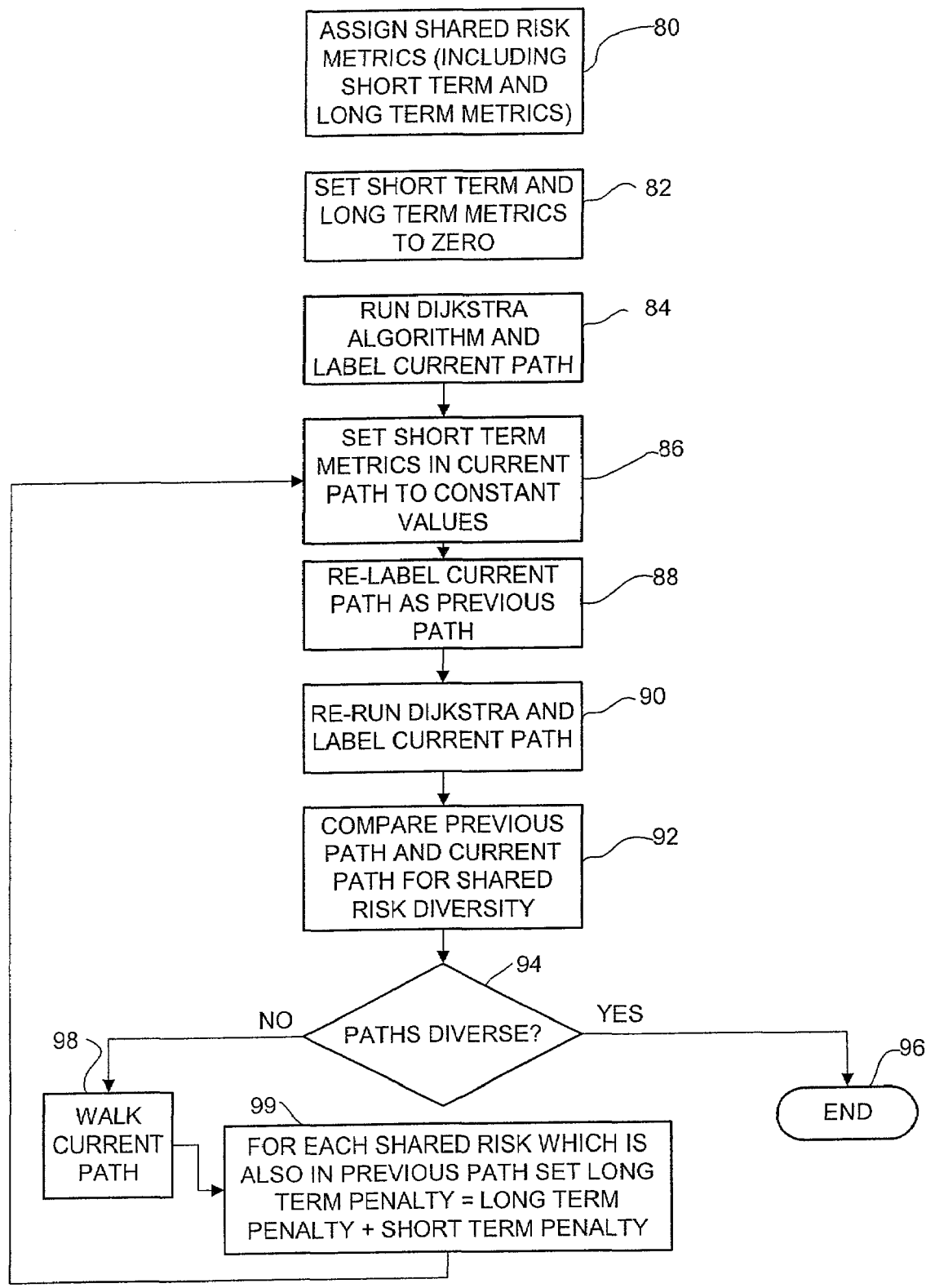
FIG. 3 is a flowchart illustrating a process of the present invention for finding shared-risk diverse paths.

Details of this process are shown in the flowchart of FIG. 3. Shared risk metrics are assigned to links or nodes (or both links and nodes) at step 80. Each Shared risk metric has a LongTerm and ShortTerm metric associated with it. The ShortTerm metric exists for the duration of one iteration of the algorithm. The LongTerm metric exists for the duration of the run. A quantity called SRmetric is calculated as the sum of the ShortTerm and LongTerm values (SRmetric=ShortTerm+LongTerm). Once a shared risk has been encountered along a path, it is not considered a second time. For example, if a path passes through two links, L1 and L2, and Shared Risk A is assigned to both links, when the maximum SRmetric is computed for L2, the metric for Shared Risk A is not considered.

Many different methods may be used to select metrics for each node and link. For example, the link or node with the greatest shared risk may be assigned a metric that is five times greater than the metric assigned to other links and nodes in the path. Other methods for assigning metrics include those described in Survivable Networks: Algorithms for Diverse Routing, R. Bhandari (The Kluwer International Series in Engineering and Computer Sciences, 1999).

The ShortTerm and LongTerm metrics are initially set to zero for all shared risks (step 82). The first iteration is thus a standard Dijkstra algorithm run with the following metrics applied (step 84):

LinkMetric: link cost plus the maximum SRmetric over all shared risks associated with a link; and NodeMetric: maximum SRmetric over all shared risks associated with a node.

It is to be understood that many other methods may be used for deriving the link and node metrics. For example, a weighted average of the SRmetric over all shared risks may be used.

The path (first path) returned by the first run is walked and the ShortTerm metric is set to a constant value for every shared risk that is included in the path (step 86). This first path is now labeled as the PreviousPath (step 88).

Dijkstra is then run again and a new path (second path) is identified and labeled as the CurrentPath (step 90). The CurrentPath is compared to the PreviousPath to see if there is shared risk diversity (step 92). If the paths are diverse, the process is complete (steps 94 and 96). If the CurrentPath and the PreviousPath are not diverse, the CurrentPath is walked and the LongTerm metric associated with each shared risk that is common to the previous path is increased (steps 94, 98 and 99). The increased LongTerm metric is defined as follows:

LongTerm=LongTerm+ShortTerm

This results in an increase of the LongTerm metric of every shared risk that was common to both paths by a constant value.

The path returned by the run is then walked and the ShortTerm metric is set to a constant value for every shared risk that is included in the path (step 86). This path is now labeled as the PreviousPath (step 88) and steps 90–94 are repeated until diverse paths are found or until a limit set on the number of iterations which are run is reached.

The present invention may be used in embedded control algorithms (e.g., MPLS-TE, GMPLS) in network elements or in network management tools (e.g., TunnelVision), for example.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for finding shared risk diverse paths, the method comprising:
   receiving route information at a node;
   running a shortest path algorithm to identify a first path;
   assigning shared risk metrics to links and nodes within said first path;
   running the algorithm with the shared risk metrics assigned to identify a second path; and
   comparing said first and second paths and assigning new shared risk metrics to links and nodes in said second path if said first and second paths are not diverse.

2. The method of claim 1 wherein receiving route information comprises receiving a topology database and shared risk data.

3. The method of claim 1 wherein running a shortest path algorithm comprises running a Dijkstra algorithm.

4. The method of claim 3 wherein a link metric used during the shortest path algorithm run is set equal to a link cost plus a maximum shared risk metric over all shared risks associated with the link.

5. The method of claim 3 wherein a node metric used during the shortest path algorithm run is set equal to a maximum shared risk metric over all shared risks associated with the node.

6. The method of claim 3 wherein a link metric used during the shortest path algorithm run is set equal to the result of a function of link cost and the shared risk metrics over all shared risks associated with the link.

7. The method of claim 1 wherein assigning shared risk metrics comprises assigning a short term metric and a long term metric to each of the links and nodes.

8. The method of claim 7 wherein the short term metric is set to a constant value for each shared risk included in said first path.

9. The method of claim 8 further comprising increasing the long term metric by a constant value for each shared risk common to said first path and said second path.

10. The method of claim 9 wherein increasing the long term metric comprises setting the long term metric equal to the long term metric currently assigned to the node or link plus the short term metric currently assigned to the node or link.

11. The method of claim 1 further comprising running the algorithm with the new assigned shared risks to identify a third path.

12. The method of claim 11 further comprising comparing said second and third paths and assigning new shared risk metrics to links and nodes in said third path if said second and third path are not diverse.

13. The method of claim 12 further comprising repeating running the algorithm and comparing paths until diverse paths are found or a limit on iterations is reached.

14. A computer program product for finding shared risk diverse paths, the product comprising:
　code that receives route information at a node;
　code that runs a shortest path algorithm to identify a first path;
　code that assigns shared risk metrics to links and nodes within said first path;
　code that runs the algorithm with the shared risk metrics assigned to identify a second path;
　code that compares said first and second paths and assigns new shared risk metrics to links and nodes in said second path if said first and second paths are not diverse; and
　a computer-readable storage medium for storing the codes.

15. The computer program product of claim 14 wherein the computer-readable medium is selected from the group consisting of CD-ROM, floppy disk, flash memory, system memory, and hard drive.

16. The computer program product of claim 14 further comprising code that assigns a short term metric and a long term metric for the links and nodes.

17. A system for finding shared risk diverse paths, the system comprising a processor operable to receive route information at a node, run a shortest path algorithm to identify a first path, assign shared risk metrics to links and nodes within said first path, run the algorithm with the shared risk metrics assigned to identify a second path, and compare said first and second paths and assigns new shared risk metrics to links and nodes in said second path if said first and second paths are not diverse, and memory for storing said route information.

* * * * *